United States Patent

Tournois

[19]

[11] Patent Number: 5,602,677
[45] Date of Patent: Feb. 11, 1997

[54] DISPERSIVE OPTICAL DELAY LINE AND USE THEREOF FOR THE COMPRESSION/EXPANSION OF LASER PULSES

[75] Inventor: Pierre Tournois, Cagnes S/Mer, France

[73] Assignee: Thomson-CSF, Paris, France

[21] Appl. No.: 245,538

[22] Filed: May 18, 1994

[30] Foreign Application Priority Data

May 18, 1993 [FR] France .................................. 93 05989

[51] Int. Cl.$^6$ ................................................. G02B 5/04
[52] U.S. Cl. .......................... 359/566; 359/615; 359/831; 372/25; 372/700
[58] Field of Search ................................. 359/566, 569, 359/615, 831, 837; 372/25, 700

[56] References Cited

U.S. PATENT DOCUMENTS

| | | | |
|---|---|---|---|
| 3,549,239 | 12/1970 | Brienza et al. | 359/566 |
| 3,719,906 | 3/1973 | Tournois | 333/30 |
| 4,655,547 | 4/1987 | Heritage et al. | 359/566 |
| 4,746,193 | 5/1988 | Heritage et al. | 359/566 |
| 5,077,621 | 12/1991 | Kühnle et al. | 359/566 |
| 5,095,487 | 3/1992 | Meyerhofer et al. | 372/25 |
| 5,263,039 | 11/1993 | Skupsky et al. | 372/25 |
| 5,329,398 | 7/1994 | Lai et al. | 359/566 |
| 5,349,591 | 9/1994 | Weston et al. | 372/25 |
| 5,530,565 | 6/1996 | Owen | 359/15 |

FOREIGN PATENT DOCUMENTS

| | | | |
|---|---|---|---|
| 2034066 | 5/1980 | United Kingdom | 359/566 |
| 2034067 | 5/1980 | United Kingdom | 359/566 |

OTHER PUBLICATIONS

J. Agostinelli, et al., "Optical Pulse Shaping with a Grating Pair", Applied Optics, vol. 18, No. 14, 15 Jul. 1979, pp. 2500–2504.

C. Shank, et al., "Compresion of Femtosecond Optical Pulses", Appl. Phys. Lett., vol. 40, No. 9, 1 May 1982, pp. 761–763.

IEEE Journal of Quantum Electronics. vol.QE–5, No. 9, Sep., 1969, pp. 454–458 "Optical Pulse Compression with Diffraction Gratings", E. B. Treacy.

Primary Examiner—Paul M. Dzierzynski
Assistant Examiner—John Juba, Jr.
Attorney, Agent, or Firm—Oblon, Spivak, McClelland, Maier & Neustadt, P.C.

[57] ABSTRACT

A dispersive, optical delay line for frequency modulated light wave pulses, especially laser waves, comprises a first optical grating and a second optical grating that are parallel to each other, separated by a distance d and localized with a pitch a on the surface of a material that has an index N and is transparent to light waves. An incident wave $\Sigma$ is diffracted at an angle $\theta'$ greater than the limit angle of refraction by transmission through the first and second optical gratings, the angle of emergence from the second grating being also equal to $\theta'$. The values of the parameters N, $\theta'$, a and d are chosen so that a variation in delay time $\Delta t_R$ of the pulse through the line corresponds to a modulation bandwidth $\Delta f$ of the pulse in a quasi-linear domain. Application to compression/expansion to obtain high-power or very short laser pulses.

2 Claims, 3 Drawing Sheets

DISPERSIVE OPTICAL DELAY LINE AND USE THEREOF FOR THE COMPRESSION/EXPANSION OF LASER PULSES

BACKGROUND OF THE INVENTION

The invention relates to the field of the compression of light pulses and, more particularly, to the compression of pulses emitted by laser sources.

The compression/expansion of laser pulses can be applied in many fields.

For example, in particle physics, the possibility of obtaining very high levels of power from a low-frequency laser enables the atomic nuclei to be extracted from their environment of electrons. The laser pulse processing line gives power density values of over $10^{18}$W/cm2. The technique used consists, broadly speaking, first of all in extending the duration of the laser pulse by about one nanosecond (for example by dispersion in an optic fiber made of non-linear material) and then in modulating the signal obtained and in amplifying the signal thus modulated (for example by pumping with a YAG/$Nd^{3+}$ laser). Amplifications of the order of some tens of joules (up to one KJ) may be obtained. The extended and amplified signal is then compressed through diffraction gratings since it is at the maximum of its peak power. Its power is then multiplied by the compression rate. This technique can be used to obtain power values of the order of some petawatts.

Another application relates to high-speed photography at very high rates, designed for example for the analysis of molecular interactions. The problem is that of being able to have extremely brief laser pulses available. When a laser pulse is modulated on a frequency band with a very great width $\Delta f$, its compression gives a pulse with a particularly short duration of $1/\Delta f$.

It is possible, for example, by the use of an adapted delay line, to obtain pulse times of the order of some femtoseconds that are compatible with such an application. Furthermore, another possible application is aimed at the detection of targets by reception of modulated pulses emitted by laser sources. This type of detection is used, for example, in LIDARS (Light Detection And Ranging devices) or in active imaging systems. At transmission, the laser pulses having a duration T are frequency modulated in order to obtain efficient detection of any target. At reception, the detection system is fitted out with a pulse compression filter that enables the temporary compression of the useful signal received according to the compression rate of T·$\Delta f$. The pulse is then frequency demodulated and the filter then delivers all the frequencies of the pulse. An analysis of these frequencies gives a target detection system.

In these applications, the compression filter constitutes a dispersive delay line whose propagation time, called a delay time, decreases ("downward" filter) or increases ("upward" filter) with the frequency. For example, a "downward" filter, which is the most widely used filter, delays the lower frequencies of the band: the high frequencies get converted into the low frequencies to give a pulse of compressed duration equal to $1/\Delta f$. Under these ideal conditions, the pulse is shortened to the maximum extent. Unfortunately, with existing dispersive optical delay lines, the performance characteristics of the compression are greatly limited, especially for large bandwidths $\Delta f$ of modulation frequency or for long pulse times T. This is the case for the best known delay line, the one designed by Edmond B. Treacy, as described in the IEEE article, "Optical Pulse Compression Wave Diffraction Gratings", Volume QE-5, September 1969, pp. 454 to 458. This delay line is constituted by a pair of parallel gratings etched on two separate plates with parallel faces. The diffraction gratings are used by reflection and the value of the angle of incidence are determined accordingly. An incident wave is then diffracted twice by a double reflection on the gratings.

The limits of existing optical delay lines are due to the fact that, with such delay lines, the variation of the delay line as a function of the frequency is not linear with this frequency.

For large spectral bandwidths $\Delta f$, or for high pulse times T, the linearity of dispersion is very limited. This substantially limits the performance characteristics of the laser pulse compression.

SUMMARY OF THE INVENTION

The invention is aimed at the making of a high-performance dispersive optical delay line, with which a major variation of the delay time as a function of the frequency is almost linear throughout the width of the corresponding frequency modulation band. In particular, the linearity error may be brought below a predetermined value on a substantial bandwidth and/or for a long laser pulse.

The invention is based on the following observation: for an optical delay line comprising two diffraction gratings used per transmission, when a light wave falls, at an angle greater than the limit angle of refraction, on a first grating etched or deposited on a transparent material with an index N, the study of the delay time of the emergent pulse as a function of the frequency reveals the existence of a point of inflexion for a center frequency fo. About this point of inflexion, the curve has a portion of high linearity in which the relative width of the passband $\Delta f$ about $f_o$, the duration T of the pulse (equal to the variation of delay time in the portion considered) and hence the compression rate T·$\Delta f$ are deduced from the choices of the values of the characteristic features of the elements of the optical delay line used.

More specifically, an object of the invention is a dispersive, optical delay line for light wave pulses modulated about a center frequency $f_o$, having a first optical grating and a second optical grating that are parallel, at a distance from each other and localized, with a pitch a, on the surface of a material with an index N, that is transparent to light waves, the value of N determining a limit value of refraction angle, wherein an incident wave is diffracted at an angle θ' which is greater than the limit refraction angle, by transmission through the first grating and then the second grating, the angle of incidence with respect to the first grating and the angle of emergence from the second grating being equal to θ' and wherein the values of the parameters N, θ', a and d are chosen so that a predetermined variation of delay time $\Delta t_R$ of a pulse, introduced by the double diffraction, corresponds to a predetermined value of a modulation bandwidth $\Delta f$ about $f_o$, in a field where the variation of delay time as a function of the frequency of the laser pulse does not diverge from a straight-line segment except by a linearity error smaller than a predetermined value.

According to a preferred characteristic, each grating is localized on one of the two faces of a prism with the faces that bear the gratings being before each other. Since the prisms have an angle at the apex equal to θ', the light wave penetrates the delay line perpendicularly to the face, that has no grating, of the first prism and emerges perpendicularly by the face, that has no grating, of the second prism.

The invention also relates to the use of this delay line for the compression/expansion of laser waves in the applications referred to further above, especially for very wide modulation bands Δf or for high pulse times.

BRIEF DESCRIPTION OF THE DRAWINGS

Other features and advantages of the invention shall appear from the following description, and from the appended figures of which respectively.

DESCRIPTION OF THE PREFERRED EMBODIMENTS

Figure 1:
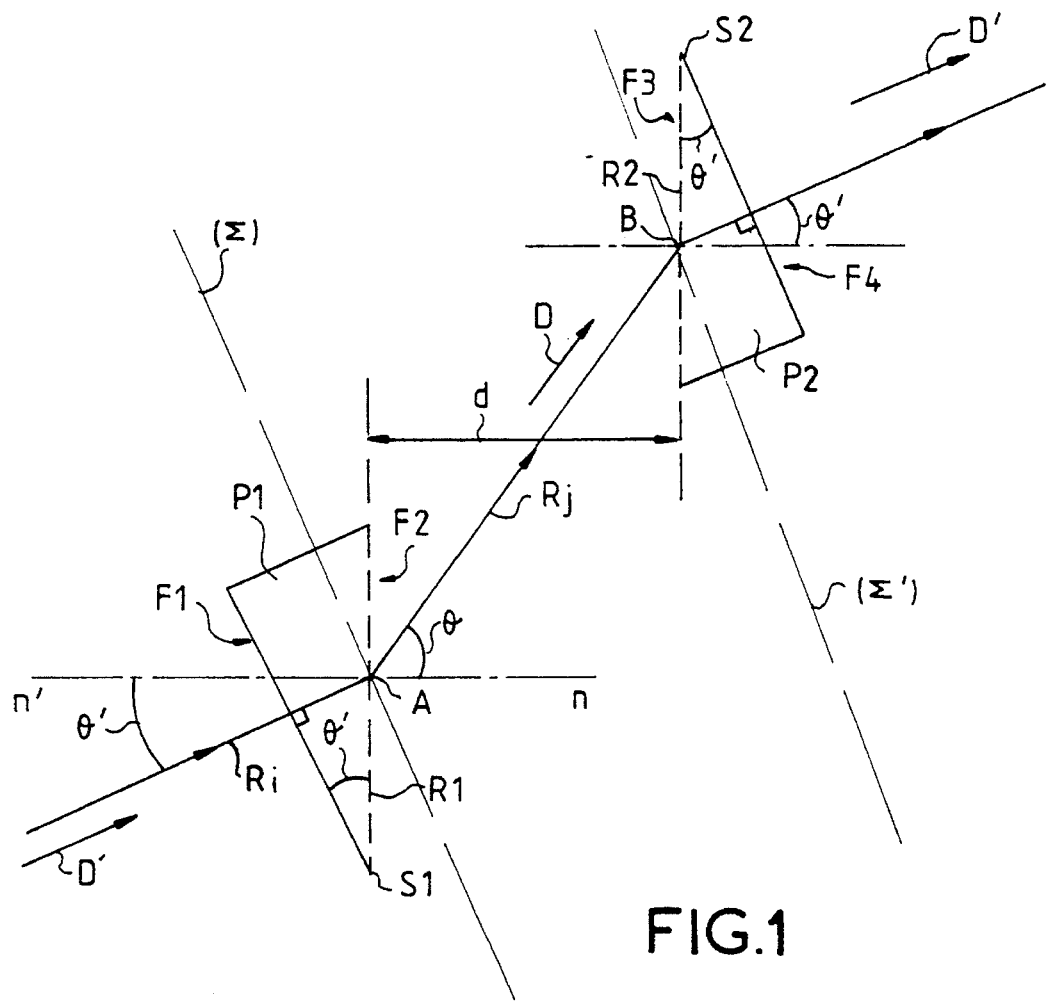
FIG. 1 shows an embodiment of the delay line according to the invention.

FIG. 1 illustrates a non-restrictive exemplary embodiment of a pair of dispersive gratings constituting an optical delay line according to the invention. The figure shows two parallel optical gratings R1 and R2 that are separated from each other by a distance d. The gratings have the same pitch a, etched on two prisms, P1 and P2 respectively. The prisms are cut out of a glass with a refraction index N to form the two plane faces, F1, F2 and F3, F4 respectively, of dihedrons whose vertices are S1 and S2 respectively. An incident plane light wave with a wavefront Σ is represented in the figure by an incident ray Ri which encounters the grating R1 of the prism P1 at a point A. The angle of incidence θ' is defined with reference to the normal n'n to the grating at the point A.

Advantageously, the direction D' of the incident wave is normal to the first face F1 crossed by the wave, so much so that the wave is not refracted before it has reached the grating R1. The angle θ' at which the incident wave is diffracted is then equal to the angle at the vertex S1 of the prism formed between its faces F1 and F2.

According to the invention, the angle θ' is greater than the limit angle of refraction, i.e. it verifies the relationship:

$$\sin\theta' > \frac{1}{N} \quad (1)$$

The incident light wave with the direction D' is diffracted by the grating R1 as a light wave with a direction D. At A, the incident light ray is then diffracted, in vacuum or in the air depending on the medium used between the prisms, along an angle θ with respect to the normal n'n to the grating R1 at A. According to the standard theory of gratings, the angles θ and θ' are related by the relationship:

$$\sin\theta = N\sin\theta' - \frac{pc}{af} \quad (2)$$

c being the velocity of light in vacuum and p being an adapted positive integer used in the theory of gratings.

The gratings used are formed in a known way by the tracing, for example, of distant parallel lines on a thin aluminium layer deposited by evaporation on the faces F2 and F3 of the prisms P1 and P2. There are other existing techniques (such as silk-screen printing and etching).

The wave diffracted in the direction D encounters the second grating R2 etched on the face F3 of the prism P2 at a point B. The second diffraction reconstitutes a plane wave with a wavefront Σ' parallel to Σ along the direction D' of the incident wave Σ perpendicularly to the output face F4.

The double diffraction produced at A and B introduces a differential delay time $t_R$ with respect to a simple propagation of the wave E in a glass having an index N, separating the wavefront Σ at the point A and the wavefront Σ' at the point B.

If the relationship (1) between the angle θ' and the index N is met, the study of the delay time $t_R$ as a function of frequency f of the incident wave shows that the representative dispersion curve has a point of inflexion for a frequency $f_o$ such that:

$$\frac{pc}{af_o} = N\sin\theta' - \frac{1}{N\sin\theta'} \quad (3)$$

The frequency fo corresponds to a diffraction angle $\theta_o$ which has the following value in putting together the foregoing relationships (2) and (3):

$$\sin\theta_0 = \frac{1}{N\sin\theta'}$$

In practice, it is convenient to represent a dispersion curve such as this in an orthonormal plane, in carrying the following quantity on the y-axis:

$$Y = \frac{c}{d} t_R + N\cos\theta'$$

and the following quantity on the x-axis $$X = \frac{af}{pc}$$

It is then worth noting that the shape of the dispersion curve obtained, for a given value of $f_o$, depends only on the value of the parameters Nsinθ', the pitch a and the distance d of the delay line according to the invention. In particular, the characteristics of excellent linearity (slope and extent) about its point of inflexion are exploited by the invention. By an adapted choice of these values, it is then possible to process a passband Δf for a variation in delay time $\Delta T_R$ equal to predetermined values for which the corresponding dispersion curve has a linearity error smaller than a predetermined value.

Figure 2:
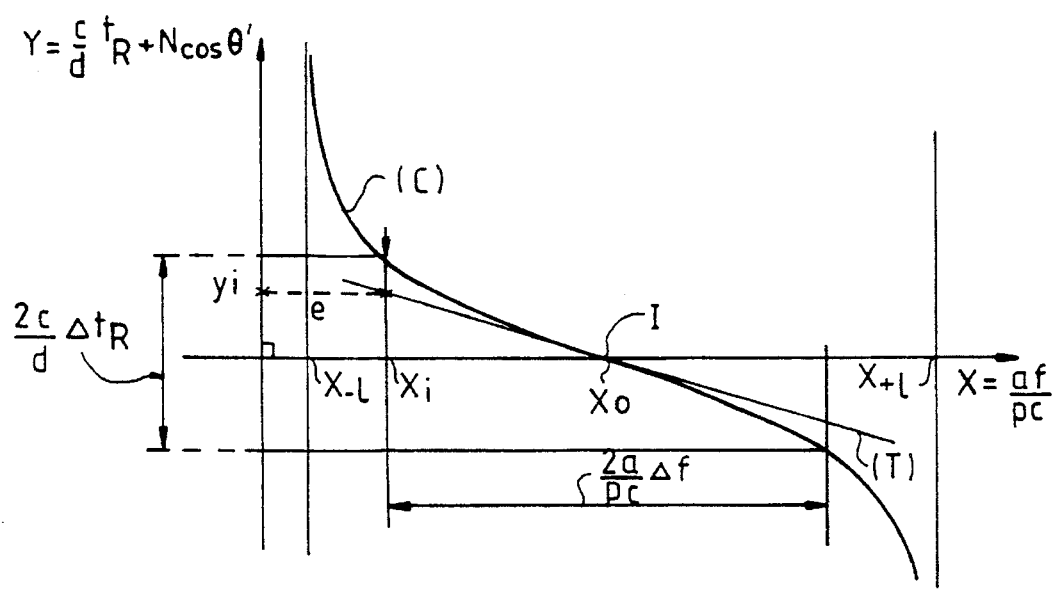
FIG. 2 shows the shape of the dispersion curves obtained with a delay line according to the invention.

To illustrate the role of the different parameters of the delay line according to the invention on the values of the range of delay time and frequency values that are accessible, FIG. 2 shows the shape of such a dispersion curve C representing the standardized delay time Y as a function of the standardized frequency X around its point of inflexion I with respect to its tangent T at the point of inflexion. The curve has two vertical asymptotes:

$$X_{\pm 1} = \frac{1}{N\sin\theta' \pm 1}$$

and has the following equation:

$$Y = \frac{N\sin\theta'}{\sqrt{1 - \left(N\sin\theta' - \frac{1}{X}\right)^2}} \left(\frac{1}{X} - \frac{1}{X_0}\right)$$

-continued $$\text{with } X_0 = \frac{af_0}{pc}$$

For a given value $X_i$, the difference e between the curve C and its tangent T at the point of inflexion I characterizes a linearity error $\delta$ equal to the difference e in relation to the value $Y_i$ of the tangent at the point considered. Since a maximum linearity error $\delta_m$ is fixed, the choice, within the limit of the relationship (1), of the values of the index N of the prisms used and of the angle of incidence $\theta'$ of the incident wave then condition the amplitude of the ranges $$\frac{2a}{pc} \Delta f \text{ and } \frac{2c}{d} \Delta t_R$$

for which the curve C shows a linearity lower than $\delta m$.

The choice of N and of $\theta'$ also conditions the central value:

$$X_0 = \frac{af_0}{pc}$$

according to the relationship (3), so much so that the values of $\Delta f$ and $f_o$ are related by a same ratio (depending only on $N\sin\theta'$) and are fixed solely by the choice of the value of the pitch of the gratings used.

The use of a pulse source with a given frequency $f_o$ thus imposes a value on the pitch of the gratings, which gives the maximum range $\Delta f$ in which the source may be used. A precise computation can be used to express this bandwidth value $\Delta f$ that can be used as a function of $f_o$, $\theta_o$, and $\delta^*_m$ ($\delta^*_m$ being a function of $\delta_m$ that is easily accessible by computation):

$$\Delta f = 4 \sin \theta_0 \cdot (\delta^*_m)^{1/2} \cdot f_o$$

Furthermore, the value:

$$\frac{c}{d} \Delta t_R$$

of the variation of the standardized delay time corresponding to the portion of the curve C having the desired linearity (with a linearity error smaller than or equal to $\delta_m$) makes it possible, by an appropriate choice of the value of d, to deduce a maximum variation of time delay of the pulse. A precise computation can be used to express this value by the relationship:

$$\Delta t_R = 4 \tan g \theta_0 (\delta^* m)^{1/2} \frac{d}{c}$$

The delay line according to the invention can be applied quite particularly to the compression/expansion of laser waves linearly modulated in frequency. Systems that implement high-power lasers or high-speed laser use laser waves with pulses of a duration T linearly modulated in a frequency band $\Delta f$. It is necessary, first of all, to extend either the duration T of the laser pulse or the modulation band $\Delta f$ and then to compress the laser waves with a delay time equal to the long duration of the pulse so that the laser pulses have a duration $$\frac{1}{\Delta f}$$

after compression, i.e. to obtain this result by applying a compression rate equal to $T \cdot \Delta f$.

The application of the delay line according to the invention to the compression of laser pulses having a central frequency $f_o$ enables the use of a passband $\Delta f$ with a laser pulse duration T (and hence a compression rate $T \cdot \Delta f$) having a predetermined value, for which the linearity of compression is higher than a given value $\Delta^*_m$. These values as a function of the values of the parameters of the delay line according to the invention ($\theta_o$, a, d) may be expressed simply by means of the following relationships.

$$\Delta f = 4tg^2\theta_0(\delta^*_m)^{-\frac{1}{2}} \cdot \frac{pc}{a}$$

$$T = 4\cot g\theta_0(\delta^*_m)^{-\frac{1}{2}} \cdot \frac{d}{c}$$

Figure 3:
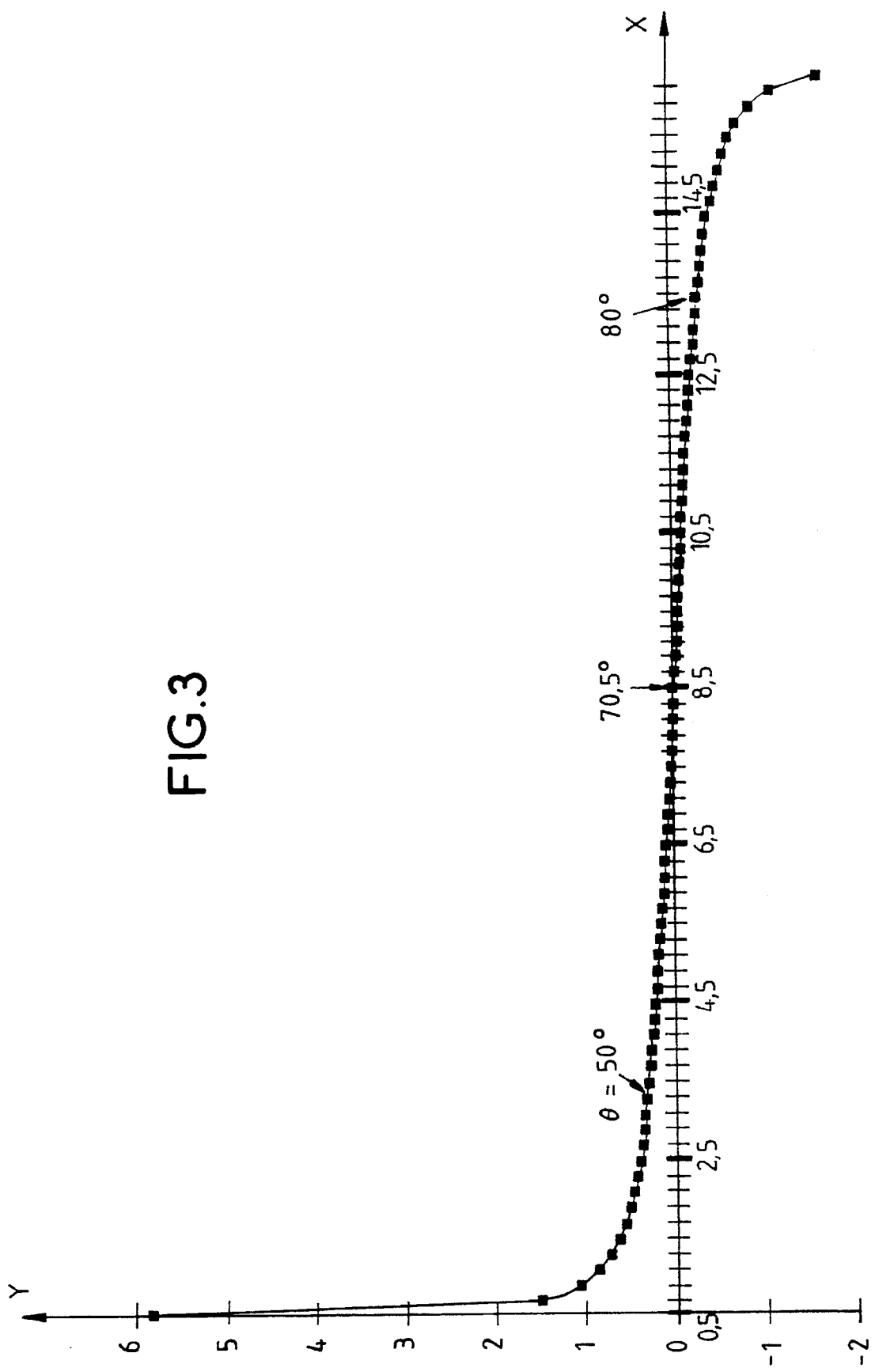
FIG. 3 shows a first example of a dispersion curve of a laser pulse going through a delay line with adapted characteristics.

For example, FIG. 3 shows the curve representing the delay time Y as a function of the frequency X for a delay line according to the invention, using a glass with an index N equal to 1.5 and an angle-of incidence $\theta'$ (equal to the angle of the prisms) equal to 45°, i.e. a value of $N\sin\theta'$ equal to 1.06. Under these conditions, the delay time is quasi-linear about an angle of diffraction $\theta_0$ equal 70.5° and a standardized frequency:

$$\frac{af_0}{pc}$$

equal to 8.5. The figure also indicates the points of the curve corresponding to the angles of diffraction 50° and 80°.

With a delay line such as this, the distance d between the gratings is chosen to be equal to 6 mm in order to obtain the quasi-linear compression of the modulated pulses having a duration T equal to 2 picoseconds. With an adapted value of p equal to 1, the pitch of the gratings is chosen to be equal to 6.86μm to enable the use of a titanium/sapphire solid laser for which the center frequency $f_o$ is equal to $3.75 \cdot 10^{14}$ hertz. Under these conditions, this delay line gives a compression rate $T \cdot \Delta f$ equal to 200 on a bandwidth equal to $10_{14}$ hertz, enabling a compression of the pulses up to a period of time $\tau$ equal to 10 femtoseconds.

Figure 4:
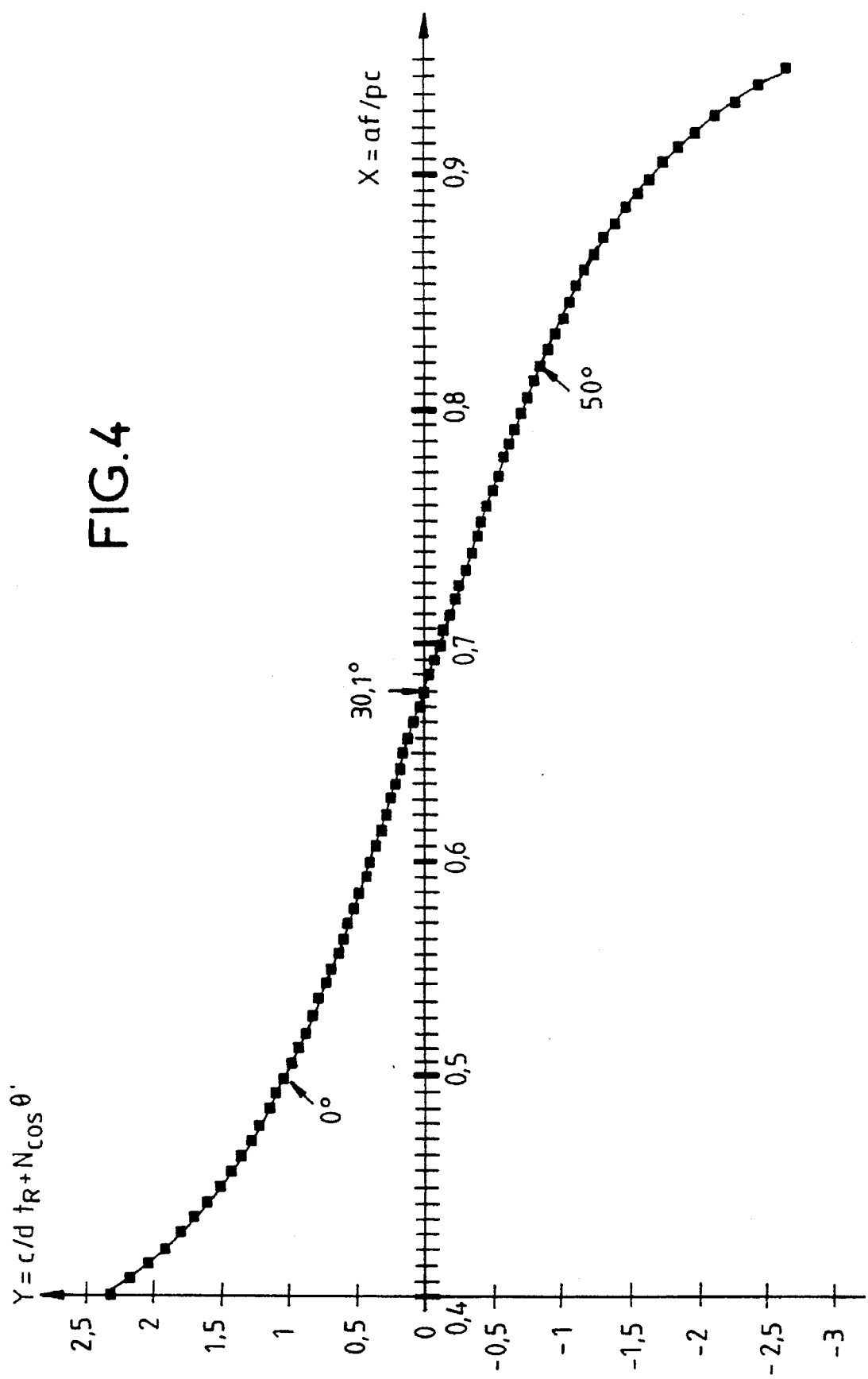
FIG. 4 shows a second example of a dispersion curve corresponding to a delay line according to the invention having other adapted characteristics.

Another example of a dispersion curve given by a delay line according to the invention is illustrated in FIG. 4. In this delay line, the prisms have an index N equal to 2, an angle $\theta'$ (equal to the angle of incidence) equal to 85°. The quantity $N\sin\theta'$ being equal to 1.99, the delay time is linear about an angle $\theta_0$ equal to 30.1° and a standardized frequency $$\frac{af_0}{pc}$$

equal to 0.67. This figure also designates, by way of an indication, the points of the curve corresponding to the angles of diffraction 0° and 50°.

The parameters d and a are then respectively chosen to be equal to one meter and 0.7 μm to enable the compression of pulses with a duration equal to 230 picoseconds delivered by a Nd+3 doped YAG laser for which $f_o$ is equal to $2.8 \cdot 10^{14}$ hertz. Under these conditions, this delay line gives a compression rate $T \cdot \Delta f$ equal to 1380. Thus, for a bandwidth $\Delta f$ equal to $6 \cdot 10^{12}$ Hz, the long pulses of this laser may be compressed to a period of time $\tau$ equal to 170 femtoseconds.

The invention is not limited to the exemplary embodiments described and shown herein. In particular, in order to obtain even higher compression rates, for example of the order of 1000, without limiting the performance values of the compression i.e. in remaining on a quasi-linear portion of the curve, it is possible to plot the path of the laser waves so as to obtain several passages in one or more delay lines of the type described. Such an arrangement can be achieved, for example, by means of appropriately positioned mirrors, or by a cascade arrangement of several delay lines.

What is claimed is:

1. A dispersive, optical delay line for one of linear compression and linear expansion of linearly modulated laser wave pulses modulated about a center frequency $f_0$, comprising:

a first optical grating;

a second optical grating parallel to said first optical grating and spaced at a distance d therefrom;

said first optical grating and said second optical grating having a pitch a on a surface of a material having an index N which is transparent to light waves, the value of N determining the maximum value of refraction for light passing through said material;

wherein the first grating and second grating are arranged such that a wave of $\Sigma$, passing through the light transmission material, is incident at an angle $\Theta'$ with respect to the surface normal of the first grating and, upon further transmission through the material, is emergent from the second grating at an angle $\Theta'$ with respect to the surface normal of the second grating, where $\Theta'$ is greater than the limit angle of refraction for the material, and satisfies the relationship $$\sin \Theta' < 1/N$$

wherein the gratings are arranged at a spacing d for light incidence and emergence at an angle $\Theta'$, to produce a predetermined variation of delay time $\Delta t_R$ of a pulse, introduced by the double diffraction, which corresponds to a predetermined value of a modulation band width $\Delta f$ about $f_0$, where the variation of delay time as a function of the frequency of the laser pulse does not diverge from a straight line segment except by a linearity error $\delta^*_m$, $\Delta f$ and T satisfying the relations:

$$\Delta f = 4 tg^2 \theta_0 (\delta^*_m)^{-\frac{1}{2}} \cdot \frac{pc}{a}$$

$$T = 4 \cot g \theta_0 (\delta^*_m)^{-\frac{1}{2}} \cdot \frac{d}{c}$$

where c is the velocity of light and p is an integer; and wherein the angle of diffraction on the first grating is $\Theta_0$ for a pulse at the central frequency $f_0$.

2. A delay line according to claim 1, wherein said first optical grating and said second optical grating are each provided on one face of a first prism and a second prism respectively, and wherein an incident ray is perpendicular to a face of the first prism which does not carry said first grating and emerges perpendicularly to a face of said second prism which does not carry said second grating.

* * * * *